US007657594B2

(12) United States Patent
Banga et al.

(10) Patent No.: US 7,657,594 B2
(45) Date of Patent: Feb. 2, 2010

(54) DIRECTED MEDIA BASED ON USER PREFERENCES

(75) Inventors: Jaz Banga, SF, CA (US); Nitin Shah, Cupertino, CA (US); Brijesh Patel, Gilroy, CA (US); Amul Patel, Pacifica, CA (US)

(73) Assignee: Feeva Technology, Inc., San Francisco, CA (US)

( * ) Notice: Subject to any disclaimer, the term of this patent is extended or adjusted under 35 U.S.C. 154(b) by 0 days.

(21) Appl. No.: 11/433,063

(22) Filed: May 12, 2006

(65) Prior Publication Data

US 2006/0265507 A1 Nov. 23, 2006

Related U.S. Application Data

(60) Provisional application No. 60/680,604, filed on May 12, 2005.

(51) Int. Cl.
*G06F 15/16* (2006.01)
(52) U.S. Cl. .................. 709/203; 709/217; 709/218; 709/219; 709/223; 709/224
(58) Field of Classification Search ................. 709/203, 709/217–219, 223–226
See application file for complete search history.

(56) References Cited

U.S. PATENT DOCUMENTS

| 6,434,747 | B1 * | 8/2002 | Khoo et al. ................... 725/46 |
|---|---|---|---|
| 6,647,257 | B2 * | 11/2003 | Owensby ................... 455/414.1 |
| 6,931,254 | B1 * | 8/2005 | Egner et al. ............... 455/456.3 |
| 7,027,801 | B1 * | 4/2006 | Hall et al. ................. 455/412.1 |
| 2003/0207683 | A1 * | 11/2003 | Lempio et al. ............ 455/422.1 |
| 2004/0053999 | A1 * | 3/2004 | Bischofberger et al. ...... 514/519 |
| 2006/0059044 | A1 * | 3/2006 | Chan et al. ..................... 705/14 |
| 2006/0164302 | A1 * | 7/2006 | Stewart ....................... 342/386 |
| 2006/0251033 | A1 * | 11/2006 | Oprescu-Surcobe et al. 370/338 |
| 2007/0088821 | A1 * | 4/2007 | Sankuratripati et al. ..... 709/224 |
| 2007/0099701 | A1 * | 5/2007 | Simon et al. .................. 463/40 |
| 2007/0112627 | A1 * | 5/2007 | Jacobs et al. .................. 705/14 |
| 2007/0140214 | A1 * | 6/2007 | Zoltan ......................... 370/352 |

\* cited by examiner

*Primary Examiner*—Shawki S Ismail
(74) *Attorney, Agent, or Firm*—Courtney Staniford & Gregory LLP

(57) ABSTRACT

A system for determining directed media for a user is provided. The exemplary system comprises a media selection optimizer which is configured to determine a directed media component based on a user profile associated, via a device identifier, with a network access device. The media selection optimizer may also utilize access point information, historic information, and access point location-centric information in its determination of the directed media component. The directed media component may then be forward to a media server which provides the corresponding directed media to the user. The directed media may comprise advertisement, coupons, video, music, or any other media which is customizable to the user.

24 Claims, 7 Drawing Sheets

DIRECTED MEDIA BASED ON USER PREFERENCES

CROSS REFERENCE TO RELATED APPLICATION

The present application claims the priority benefit of U.S. Provisional Patent Application No. 60/680,604, filed May 12, 2005, entitled "Systems and Methods of Network Operation and Information Processing, Including Business and Advertising Methods" which is herein incorporated by reference. The present application is also related to U.S. patent application Ser. No. 11/433,070 filed May 11, 2006 and entitled "Developing Customer Relationships with a Network Access Point" which is herein incorporated by reference.

BACKGROUND OF THE INVENTION

1. Field of the Invention

Embodiments of the present invention relate generally to network access and more particularly to providing directed media in a network.

2. Description of Related Art

Presently, content providers and advertisers are having increased difficulty in identifying, creating, and maintaining relationships with their user base. These relationships are limited by current technology. Generally, users interact with the content providers and advertiser by accessing a web site via a network access device. Users have traditionally been identified by either the user's current destination on the network through personal accounts or through downloaded programs on the user's network access device (e.g., cookies).

In some prior art embodiments, content providers request or require users to have personal accounts. When a user creates a personal account, the user is often requested to register and provide personal information that helps the content provider to identify and maintain a relationship with that user. While the registration provides information to the content provider, the content provider is typically not able to use this information in order to tailor/customize media, such as advertisements, to the individual user.

Alternatively, content providers may place cookies on user's network access device. A cookie is a small text file or program that certain Internet sites attach to the user's hard drive within the computing device. A cookie can contain information such as a user identifier, user preferences, shopping information, personally identifiable information, and a list of web sites previously visited. As the user revisits a content provider's web site, the content provider can retrieve the cookie to identify the user and then update the cookie as appropriate. Many users, however, view cookies as an invasion of privacy. As such, many users disable the function that allows cookies to be stored on their computing devices. Further, users can erase their cookies manually or purchase anti-spyware and anti-virus programs which either prevent cookies from downloading or delete cookies entirely (e.g., cookie churn.). That is, the use of the cookie method lacks persistence (i.e., can be deleted). As with registration, the information typically cannot be used to tailor media to the user.

Presently, publishers sell inventory (e.g., advertisement space) on a content provider's web site based on aggregated statistical demographics of all visitors to the web site. The demographics may also include a user survey, typically, of 1000 respondents. This survey, however, are of a basic nature (e.g., gender, age, income level), and does not account for individuality of the users.

Therefore, there is a need for systems and methods for directing media to a user based on user preferences.

SUMMARY OF THE INVENTION

Embodiments of the present invention provide systems and method for determining directed media to provide to a user on a web site. In exemplary embodiments, a user profile is associated with each network access device. When a user of the network access device attempts to access a content provider's web site, the IP address of the network access device is used by a customer relationship server to identifier the particular network access device. The corresponding user profile is then obtained.

An exemplary media selection optimizer determines a directed media component based on the user profile. In some embodiments, the media selection optimizer reviews user preferences associated with the user profile to determine the type of media which is best suitable for presentation to the user via a web page of the content provider. The directed media component may be a media tag identifying a media, or type of media, which should be presented to the user. Alternatively, the directed media component may be the directed media, itself.

In further embodiments, the media selection optimizer utilizes access point information, historic information, and/or access point location-centric information along with the user profile information to determine the directed media component. The access point information is retrieved from an access point through which the network access device is accessing the network. The historic information is based on past interactions which form patterns of usage for the network access device. In some embodiments, the historic information may be incorporated into the user profile. The location-centric information is obtained from any source with knowledge of events, conditions, and other attributes of the location in which the access point is located.

Once the directed media component is determined, the directed media component may be forward to a media server which provides the corresponding directed media to the user. The directed media may comprise advertisement, coupons, video, music, or any other media which is tailored to the user preferences.

DETAILED DESCRIPTION OF EXEMPLARY EMBODIMENTS

Embodiments of the present invention provide exemplary systems and methods for providing directed media to a user. By utilizing a user profile containing user preferences, the present systems can identify media or media types which are most relevant to the user. The user profile is associated with a device identifier, which is persistent (e.g., may not be deleted nor changed). The present systems also may use real-time information related to the user or user's location to tailor the media presented to the user. This allows a publisher to maximize their advertising revenues.

Figure 1:
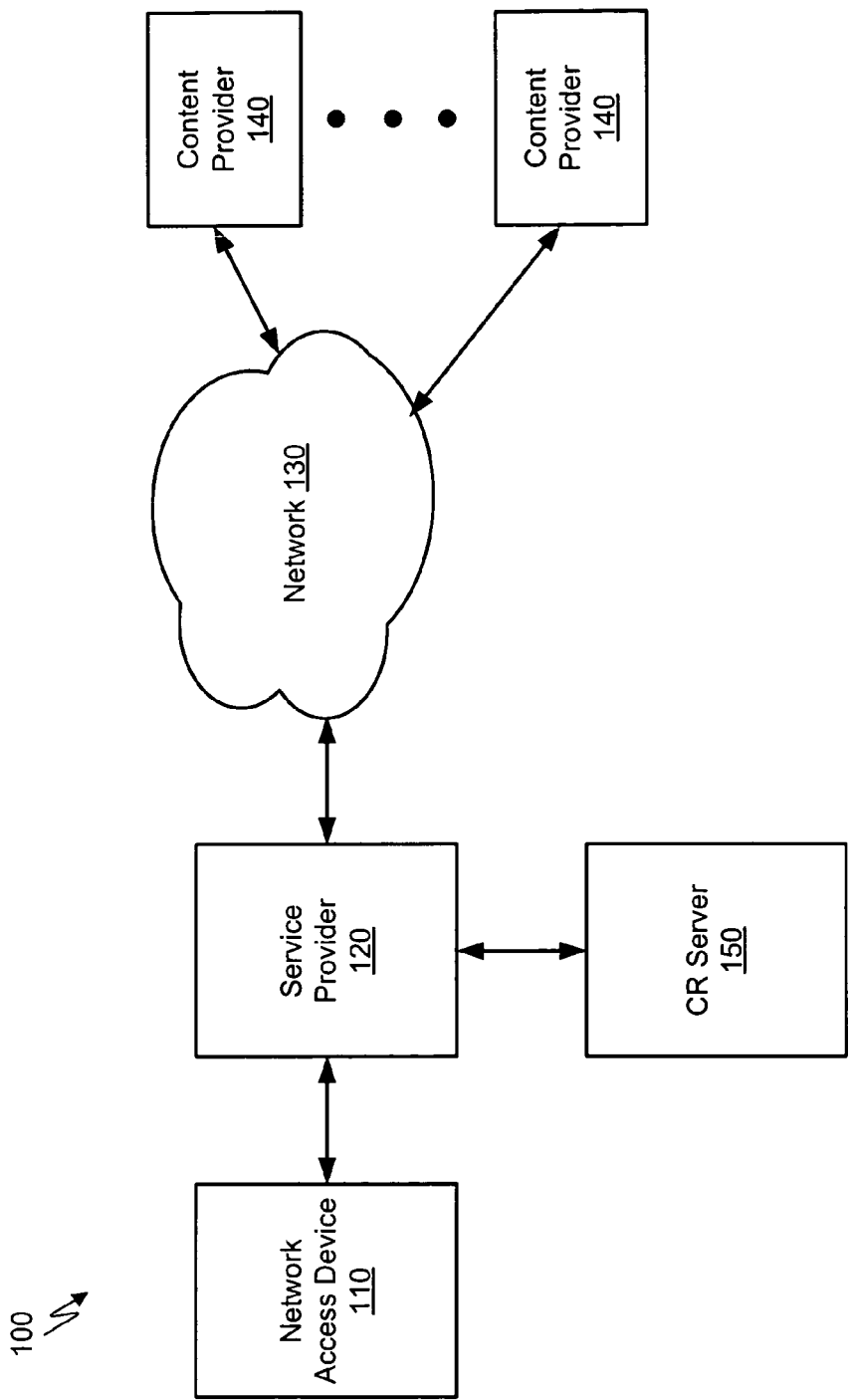
FIG. 1 is an exemplary block diagram of a simplified environment employing embodiments of the present invention.

Referring to FIG. 1, an exemplary environment 100 in which embodiments of the present invention may be practiced is shown. Unlike much of the prior art where users of computing devices are tracked through cookies on their computing devices or sites the users visit over the Internet, users of the present embodiment can be identified and their preferences determined and tracked through a user's act of logging onto a network 130 or obtaining network service through a service provider 120.

In the present embodiment, the environment 100 comprises at least one network access device 110, the service provider 120, a network 130, a plurality of content providers 140, and a client relationship server ("CR server") 150. In exemplary embodiments, the network 130 is the Internet. Alternatively, the network 130 may be a local area network (LAN), intranet, or extranet.

In some embodiments, a user activates the network access device 110 in order to communicate with the network 130. The network access device 110 is any digital device capable of communications over the network 130. Examples of the network access device 110 include desktops, laptops, personal digital assistants, and cellular telephones. The network access device 110 may comprise a wireless network access driver, a router, a cable modem, a phone modem, or any other device capable of providing access to the network 130.

In embodiments of the present invention, the network access device 110 may comprise a device identifier which is used by the CR server 150 to identify the network access device 110. The device identifier may comprise a media access control address (MAC address), an international mobile station identity (IMSI), an international media equipment identity (IMEI), or any anonymous device identifier. In further embodiments, the network access device 110 may also comprise a software or hardware derived unique identifier. Accordingly, unique identifiers of software or hardware present on the network access device 110 can be indexed and grouped with, for example, MAC addresses, to create a unique anonymous device identifier.

The service provider 120 is a device configured to provide the network access device 110 access to the communications network 130. In some examples, the service provider 120 is a switch, bridge, gateway, router, or any combination of these devices. The service provider 120 is typically controlled by a business that supplies network connectivity (e.g., Internet service provider, "ISP"). In one embodiment, the service provider 120 assigns an external IP address to each network access device 110 seeking access to the communications network 130.

The exemplary content provider 140 is any digital device configured to provide information to users of network access devices 110 over the network 130. In some embodiments, the content provider 140 is a web site. In other embodiments, the content provider 140 is an e-mailer or a file transport (FTP) site. The content provider 140 is typically controlled by an individual, group, or business that provides information for viewing or distribution over the network 130. In some embodiments, content provided may comprise data, video, audio, software, or any combination thereof.

The exemplary CR server 150 is configured to identify any number of network access devices 110 seeking access to the network 130, and to generate a user profile for each network access device 110. The user profile may be used to build and develop relationships between users of the network access devices 110 and the owners or agents of products and/or services. In various embodiments, the CR server 150 may be coupled to the network access device 110, the service provider 120, or the network 130.

The CR server 150 is further configured to receive a device identifier from the network access device 110 seeking access to the network 130. The CR server 150 also receives access information and other information associated with the user, such as the current IP address assigned to the network access device 110. The CR server 150 generates the user profile based on the device identifier, access information, and other information associated with the device identifier.

In one example, users operate the network access device 110 to connect to the network 130. The users are identified and their preferences determined by the CR server 150 based on the number of times the user seeks network 130 access, where the user seeks access from, and any other available information. Unlike many examples in the prior art, the CR server 150 does not need to place cookies on user's network access device 110, nor does the CR server 150 monitor the content provider 140 that the user's visit. Rather, the CR server 150 receives a device identifier from the user's network access device 110 and/or the service provider 120. Through the device identifier, the user can be recognized and the number of times and where the user accesses the network can be stored to assist in the generation of the user profile.

In alternative embodiments, cookies may still be placed on the network access device 110. Because most of the current advertisement industry is based on using cookies, the use of a cookie and/or a device identifier will assist in transitioning the advertisement industry away from the current cookie-only system. As a result, each network access device 110 may be identified by a hybrid cookie/device identifier combination.

It should be noted that any number of network access devices 110, service providers 120, and content providers 140 may be embodied within the environment 100 of FIG. 1.

Figure 2:
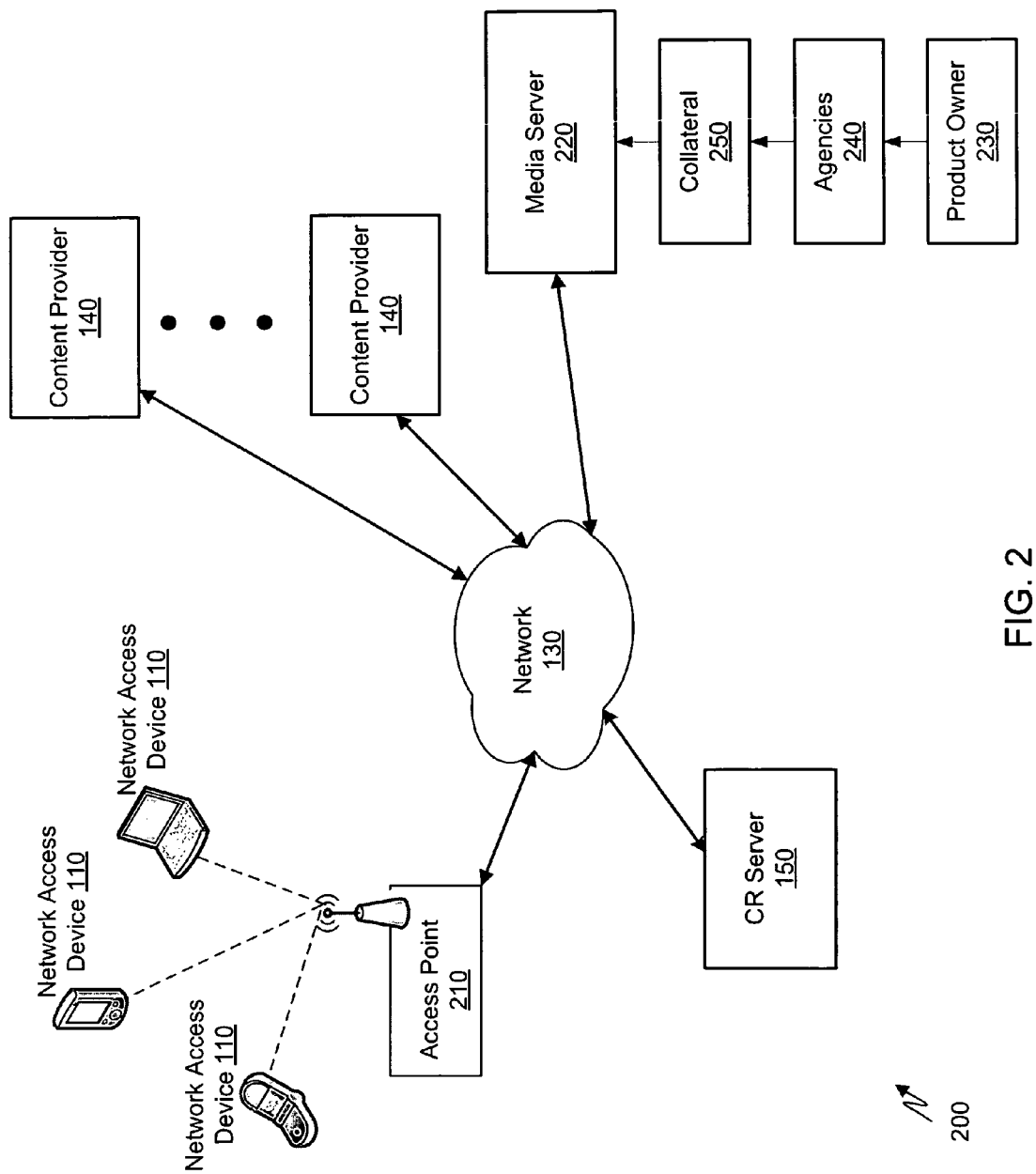
FIG. 2 is an exemplary block diagram of an alternative environment in which embodiments of the present invention may be employed.

Referring now to FIG. 2, an exemplary block diagram of an alternative environment 200 in which embodiments of the present invention may be employed is shown. The environment 200 comprises a plurality of network access devices 110 coupled to the network 130 via an access point 210, a plurality of content providers 140, and the CR server 150. The environment 200 further comprises a media server 220 that works, directly or indirectly, with product owners 230, agencies 240, and collaterals 250. While the network access devices 110 are show wirelessly coupled to the access point 210, one or more of the network access devices 110 may be coupled to the access point 210 over a wire (e.g., Ethernet, USB, firewire).

The access point 210 is a device that couples that network access devices 110 to the network 130. The access point 210 may comprise a base station, router, hub, or switch. In one example, the access point 210 is a router (wire or wireless) installed within a business (e.g., coffee shop) or location (e.g., city park) that allows users of the network access device 110 access to the network 110 (e.g., a hotspot). Although the access point 210 is shown directly coupled to the network 130, alternatively, the access point 210 may be coupled to the network 130 via a service provider 120 (FIG. 1). In other embodiments, the access point 210 is, or is a part of, the service provider 120. The access point 210 may comprise hardware, software, or firmware. The software or firmware may comprise one or more programs or portions of code that are provided in the form of machine-readable instructions that are executable by a processing unit of one or more hardware elements.

In one embodiment, when the access point 210 is installed, the access point 210 negotiates an IP address from the service provider 120. As a network access device 110 seeks network access, the network access device provides the access point 210 its device identifier such as a MAC address. The access point 210 may be configured to authenticate the MAC address and assign an IP address to allow the network access device 110 access to the network 130 through the access point 210.

The access point 210 directs the device identifier as well as access information to the CR server 150. Access information may comprise any information associated with the device identifier. In one embodiment, the access information identifies the access point 210, such as with an IP address or other identifier. The access information may also comprise information identifying the date and time the network access device 110 sought access, a type of business that is operating the access point 210, and/or the amount charged to the user of the network access device 110 for service. In other embodiments, a router between the access point 210 and the network 130 is configured to direct the device identifier and access information to the CR server 105.

The CR server 150 is configured to receive the device identifier and the access information from the access point 210. The device identifier and access information is then stored within a record. The record tracks the device identifier and access information. Additionally, the record may store any other kind of information associated with the device identifier.

In exemplary embodiments, when the user visits a web site of a content provider 140, the user will see directed media on portions of a web page. In some embodiments, the directed media is targeted advertisement. Alternatively, the directed media may comprise targeted audio, video, coupons, or other media tailored to the interests/preferences of the user. The directed media is typically located on particular portions of the content provider's web page (e.g., in a banner ad location).

In some embodiments, the directed media is placed on the content provider's web page via the media server 220. The media server 220 works in connection with the CR server 150 to determine the directed media to provide each user. The media server 220 is further associated with the collateral 250 which produces the media and the agency 240 which creates the media based on requirements of the product owner 230. For example, soda company X (product owner 230) may hire an ad agency (agency 240) to design an advertisement (media) for the product owner 230. The agency 240 may work with a web advertisement designer (collateral 250) to create the media. The media is then stored in the media server 220 until it is served to the user via the web page of the content provider 140. In some embodiments, the media comprises a media profile tag which identifies the type of user to which the media should be directed/targeted. More than one media profile tag may be associated with a media.

Figure 3:
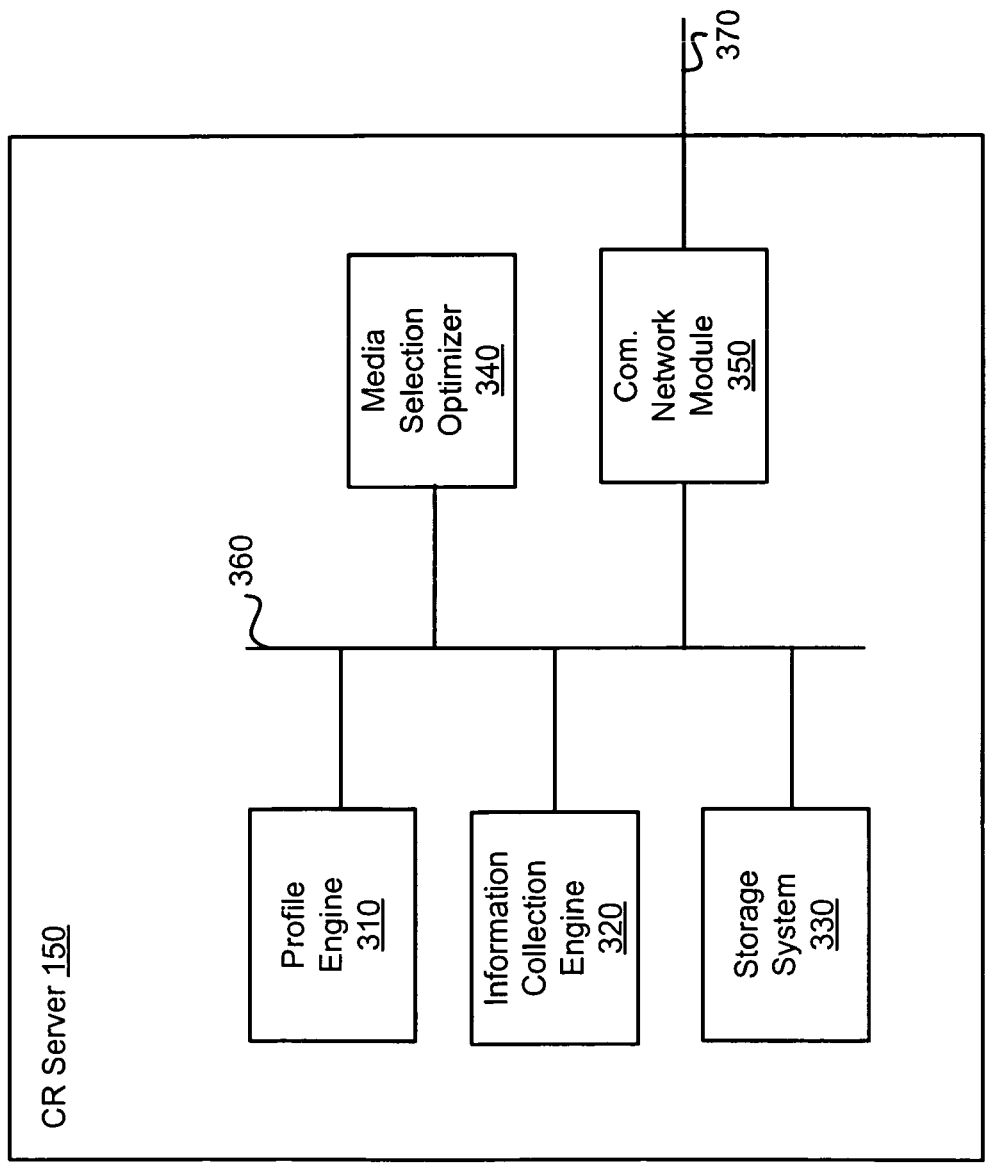
FIG. 3 is a block diagram of an exemplary CR server.

Referring now to FIG. 3, the exemplary CR server 150 is shown in more detail. In one embodiment, the CR server 150 comprises a profile engine 310, an information collection engine 320, a storage system 330, a media selection optimizer 340, and a communication network module 350 all coupled via a communication bus 360. The communication network module 350 communicates with the network 130 (FIG. 1) via a network link 370.

The profile engine 310 is configured to generate user profiles based on characteristics associated with the user and the user's network access device 110 (FIG. 1). Each user profile may comprise one or more device identifiers (of the network access devices 110), access information, device histories, and any other information associated with the network access devices 110 or device identifier. Each user profile identifies a user (indirectly via the network access device 110 the user is using) through the current IP address and device identifier (or other information) associated with the network access device 110. In some embodiments, the device identifier is a MAC address. In other embodiments, the device identifier is an IMSI or IMEI. In yet further embodiments, the device identifier may comprise a unique identifier of software or hardware present on the network access device 110.

The profile engine 310 can further customize the user profile based on individual characteristics, preferences, and habits of the user of a particular network access device 110. For example, if the user repeatedly accesses the network 130 with the same network access device 110 through an access point 210 at a particular coffee shop, the user profile associated with the device identifier may indicate that the user has a preference for the coffee shop. As a result, the user profile may indicate that the user prefers coffee or a particular coffee shop.

The profile engine 310 can also incorporate group characteristics into the user profile. That is, the user profile may include one or more group identifiers indicating a group type that the user is associated with. For example, a group identifier may be included in the user profile covering a group of users of a particular gender and age living in a specific city and having similar hobbies (e.g., male between 18-30 in the San Francisco area who enjoy baseball). Alternatively, a plurality of group identifiers may be used to identify groupings the user may be associated with. That is, for example, one group identifier may indicate the gender and age, while a second group identifier may indicate the city, and the third group identifier indicates a hobby. Alternatively, other combinations of characteristics and group identifier may be used (e.g., a single group identifier to indicate gender, age, and location).

In some embodiments, the user profiles collectively identify general trends. For example, a high number of users may be male within a certain range of ages and seek network access within a specific football stadium. As a result, a group identifier may be generated for males within the age range that prefer football. Other group identifier may be generated as well, such as a group identifier for males who prefer sports, or a group identifier that associates users within an age range and sports.

In another embodiment, predetermined group identifiers may be generated and utilized by the profile engine 310. For example, a soft drink company may wish to direct advertisements to certain demographics. A group identifier can be generated that corresponds to that demographic, and user profiles that fall into the demographic will include this group identifier. The generation of the user profile is described in detail in U.S. application Ser. No. 11/433,070, entitled "Developing Customer Relationships with a Network Access Point," which is incorporated by reference.

It should be noted that embodiments of the present invention allow the user to modify or update the user profile associated with their network access device 110. Additionally, the user may block or hide some information which the user prefers to remain private (e.g., name or address).

The information collection engine 320 is configured to receive or obtain information from the network access device 110, the access point 210, and any other source of information which may be associated with the user profile, user preferences, and the network access device 110. The information collection engine 320 may be further configured to store the information in the storage system 330. In some embodiments, the information is stored in a device record. The information collection engine 320 will be discussed in more detail in connection with FIG. 4.

The storage system 330 is configured to store the information from the collection engine 320. The storage system 330 may also store user profiles.

The media selection optimizer 340 is configured to determine a directed media which should be presented to a user. In exemplary embodiments, the media selection optimizer 340 receives an IP address of a network access device 110 that is attempted to access a content provider 140. Based on the IP address, the media selection optimizer 340 can determine the associated network access device 110, and retrieve user profile information associated with the network access device 110 (e.g., based on the device identifier). The media selection optimizer 340 may also retrieve other information (e.g., access point and location-centric information) via the information collection engine 320. Using the retrieved information, the media selection optimizer 340 performs an analysis to match up the user profile information, user preferences, and group identifiers with access point and location-centric information to determine the most appropriate media or media type that should be directed to the network access device 110 requesting the content from the content provider 140. In some embodiments, a media tag identifying the media or media type is forwarded to the media server 220 or the content provider 140. In alternative embodiments, the actual media may be forwarded to the media server 220 of content provider 140.

The communication network module 350 is a communication interface for the CR server 150 to the network access devices 110, access point 210, service provider 130, network 130, content providers 140, media server 220, and any other device in the network 130.

Figure 4:
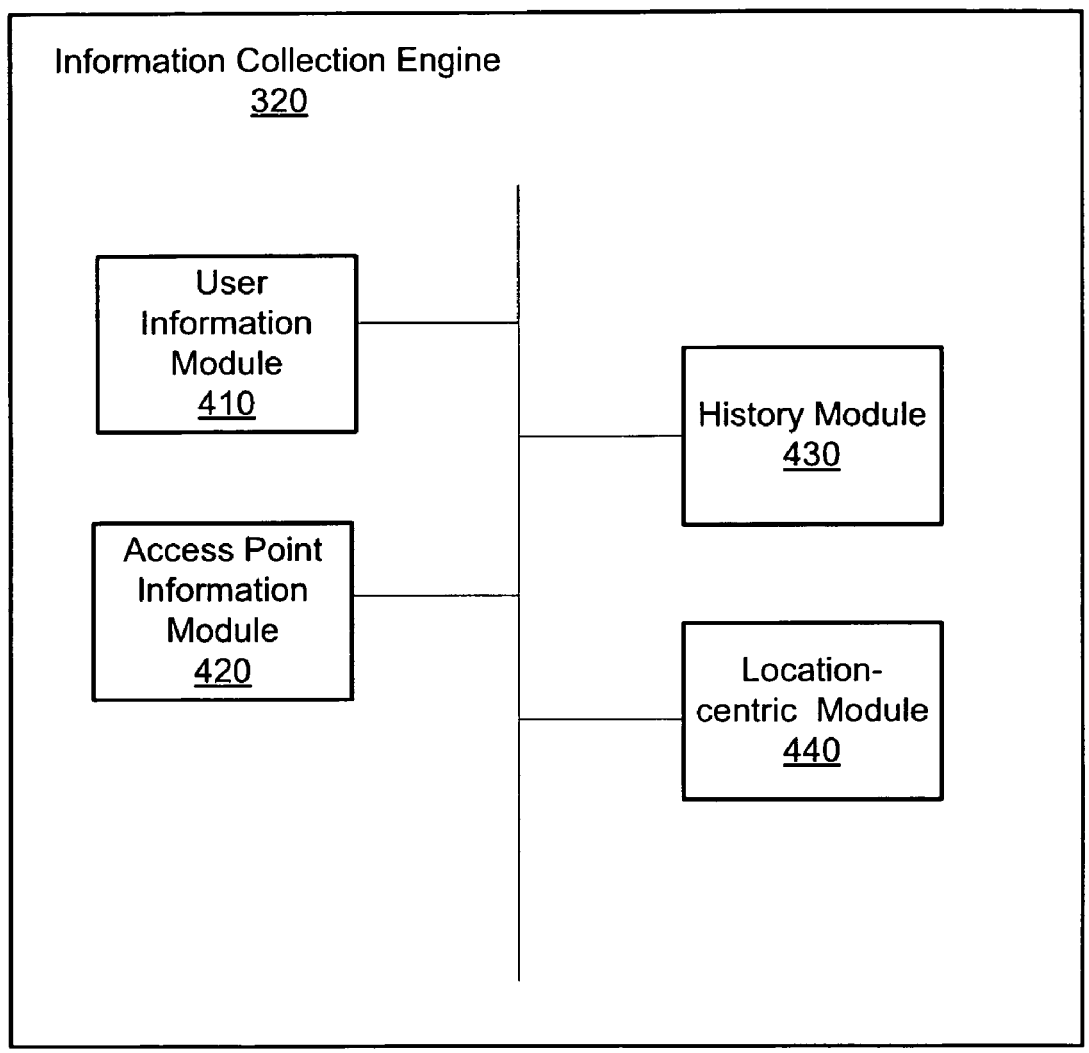
FIG. 4 is a block diagram of an exemplary information collection engine.

FIG. 4 shows the information collection engine 320 in more detail. In some embodiments, the information collection engine 320 comprises a user information module 410, an access point information module 420, a history module 430, and a location-centric module 440. Alternative embodiments may comprise more, less, or functionally equivalent modules.

The user information module 410 obtains user information including information associated with the network access device 110. For example, the user information module 410 may receive the MAC address and IP address of the network access device 110, or any other information which may be obtained from the network access device 110. This information is then stored in the storage system 330.

The access point information module 420 obtains information related to the access point 210. This information may include the location of the access point 210, type of establishment associated with the access point (e.g., a coffee shop, city park, etc.), and any other information which may be obtained from the access point 210.

The history module 430 is configured to collect and maintain historic information regarding a network access device 110. For example, every time a same device identifier is received by the CR server 150, a number of times the network 130 is accessed, the corresponding access point 210 used, date and time of access, and so forth may be tracked by the history module 430. Historical information is then used to establish a pattern for which aspects of the user profile may be developed from. For example, if a user has a history of accessing the network 130 from a particular location at a particular day and time (e.g., corner coffee shop at 10 am every Sunday), the history module 430 will record this pattern. The pattern may then be used to assign group identifiers.

The location-centric module 440 is configured to obtain location-centric (local) information associated with a location of the access point 210. The location-centric information may comprise time, weather, special events, types of businesses located nearby, and any other information related to the location. This information may be obtained from the access point 210 or from other sources such as, for example, websites, weather services, and GPS satellites. In some embodiments, the location-centric information may be stored in the storage system 330. In other embodiments, the location-centric information is constantly updated and thus is not stored in the CR server 150 but obtained when needed.

Figure 5:
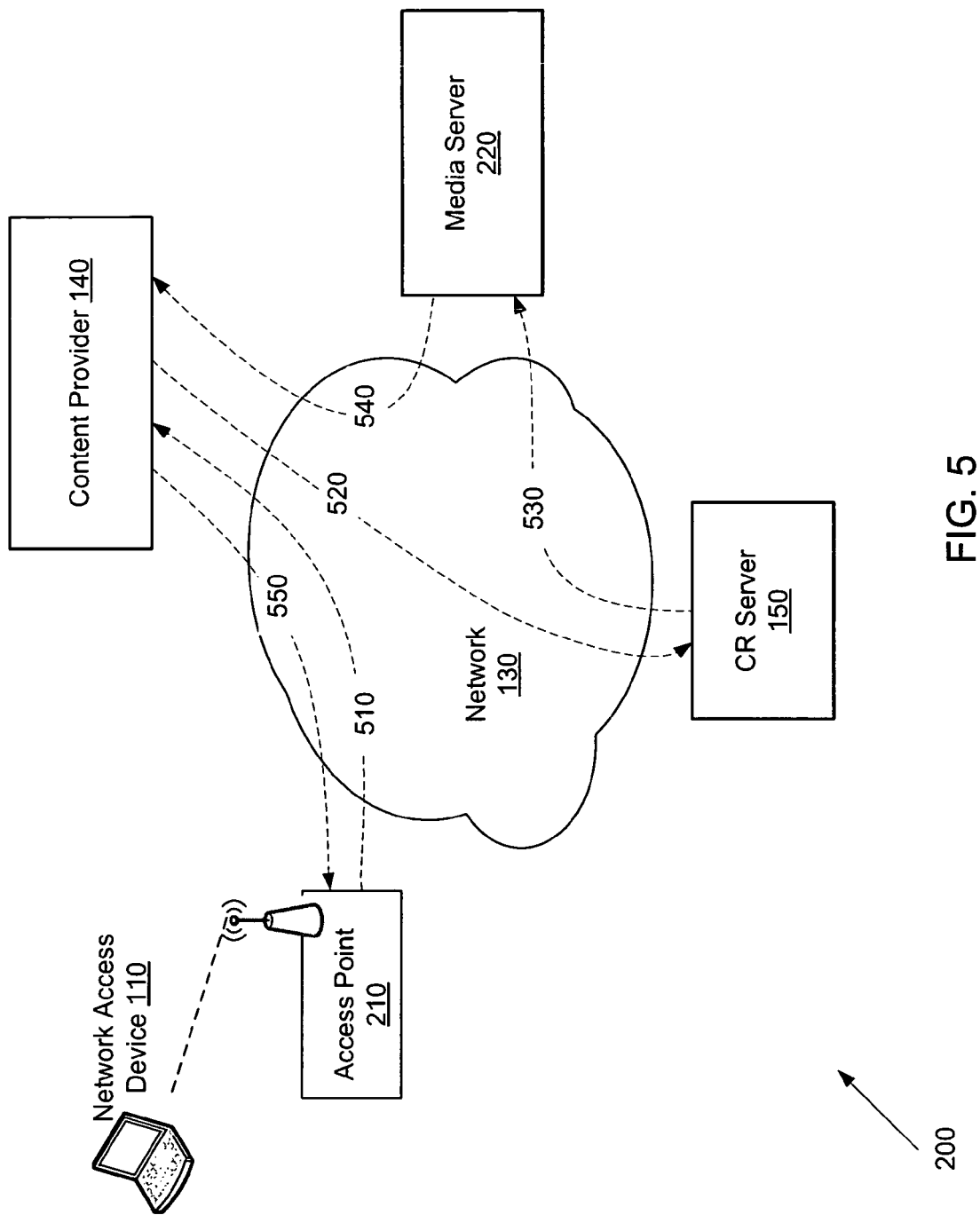
FIG. 5 is a diagram of an exemplary communication path in the environment of FIG. 2.

Referring now to FIG. 5, a diagram of an exemplary communication path in the environment of FIG. 2 is shown. Initially, a user, via a network access device 110, accesses the network 130 by way of the access point 210. Typically, the user will request access to a particular content provider 140. This request is sent via communication path 510 from the access point 210 to the content provider 140. The request may also comprise an IP address assigned by the access point 210 to the network access device 110.

Once the content provider 140 receives the request, the content provider 140 will forward the IP address to the CR server 150 via communication path 520. In some embodiments, the IP address is forwarded through the media server 220 to the CR server 150.

Based on the IP address, the CR server 150 can determine the corresponding network access device 110 that is providing the request. In exemplary embodiments, the user information module 410 receives the device identifier (e.g., MAC address) and the corresponding IP address when the network access device 110 accesses the network 130. Thus, the CR server 150 can determine the particular network access device 110 given the IP address received from the content provider 140.

With the device identifier of the network access device 110, the CR server 150 obtains a corresponding user profile associated with the device identifier. The information collection engine 320 (FIG. 3) may also obtain location-centric information associated with the access point 210 location along with history information. All of the information is then analyzed by the media selection optimizer 340 to obtain a media tag or media which is most relevant to present to the requesting user. This media tag or media is provided to the media server 220 via communication path 530.

The media server 220 then provides the directed media (e.g., associated with the media tag) to the content provider 140 via communication path 540. In some embodiments, the directed media is an advertisement which is placed in a banner ad location.

The content provider 140 then provides the requested content to the requesting user via communication path 550. The requested content will include the directed media that is tailored to the user profile/preferences of the network access device 110 that the requesting user is utilizing.

It should be noted that the communication paths of FIG. 5 are exemplary. Alternative embodiments may comprise different paths. For example, the media server 220 may be embodied within the content provider 140. In this situation, communication paths 530 and 540 will be combined into a single communication path.

Figure 6:
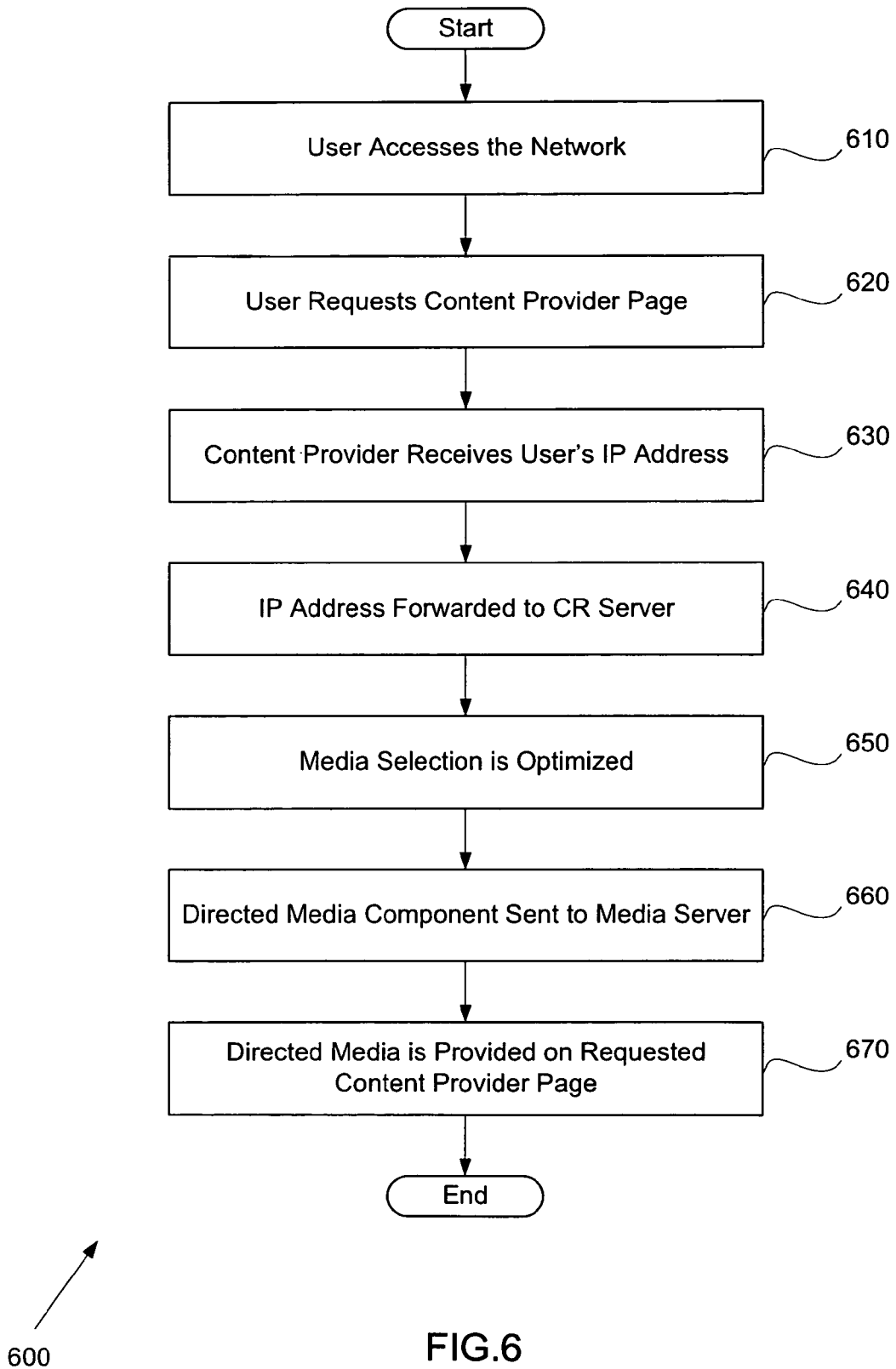
FIG. 6 is a flowchart of an exemplary method for providing directed media to a user.

Referring to FIG. 6, a flowchart 600 of an exemplary method for providing directed media to a user is provided. In step 610, a user accesses the network 130 (FIG. 1). In exemplary embodiments, the network 130 is access via a network access device 110 by way of the access point 210 (FIG. 2).

In step 620, the user will request access, via the network access device 110, to a particular content provider 140 (FIG. 1). This request is sent to the content provider 140 through the access point 210. In exemplary embodiments, the request is made when a user enters a URL address for the content provider 140 of interest.

The request is received by the content provider 140 (step 630). In exemplary embodiments, the request includes an IP address assigned by the access point 210 to the network access device 110 during the current network 130 access session. The IP address is unique to the network access device 110 and can used to identify the particular network access device 110.

In step 640, the content provider 140 forwards the IP address to the CR server 150. In some embodiments, the IP address is forwarded directly from the content provider 140 to the CR server 150. In alternative embodiments, the IP address is first forwarded to the media server 220, which then forwards the IP address to the CR server 150.

Media selection is then optimized in step 650 for the network access device 110 associated with the IP address. The optimization analyzes a user profile, access point 210 information, and location-centric information to determine a directed media component that is most relevant for the user. Step 650 will be discussed in more detail in connection with FIG. 7.

The directed media component is sent to the media server 220 in step 660. In some embodiments, the directed media component is a media tag that indicates the media or type of media that should be provided to the user. For example, the media tag may indicate that an advertisement that is directed to a male between 18-30 who likes baseball should be provided. The media server 220 may comprise a plurality of media that is code with corresponding media profile tags. The media server 220 can then take the optimized media tag from the CR server 150 and select a media having the same corresponding media profile tag.

In other embodiments, the directed media component is the directed media, itself. For example, if the user profile indicates that the user is a male between 18-30, the temperature is over 80° (location-centric information), and it's near noon time (location-centric information), then an advertisement (directed media) from Coke® will be provided. It should be noted that step 660 is optional.

In step 670, the directed media is placed onto the requested web page from the content provider 140, and the requested page is provided to the user. In exemplary embodiments, the directed media is positioned in a portion of the web page, such as in a banner ad location. The directed media may comprise a static or dynamic advertisement, a video, music, or any other form of media which may be customized to a user based on the user profile and preferences.

It should be noted that the method of FIG. 6 is exemplary. Alternative embodiments may comprise more, less, or different ordered steps and still be within the scope of embodiments of the present invention. For example, step 660 may be optional. That is, the directed media is provided by the CR server 150 directly to the content provider 140. In another example, the directed media component may be sent directly to the content provider 140. In this example, the content provider 140 comprises a media database and/or server component(s) that contain media which can be provided on the requested web page based on the received directed media component (e.g., media tag).

Figure 7:
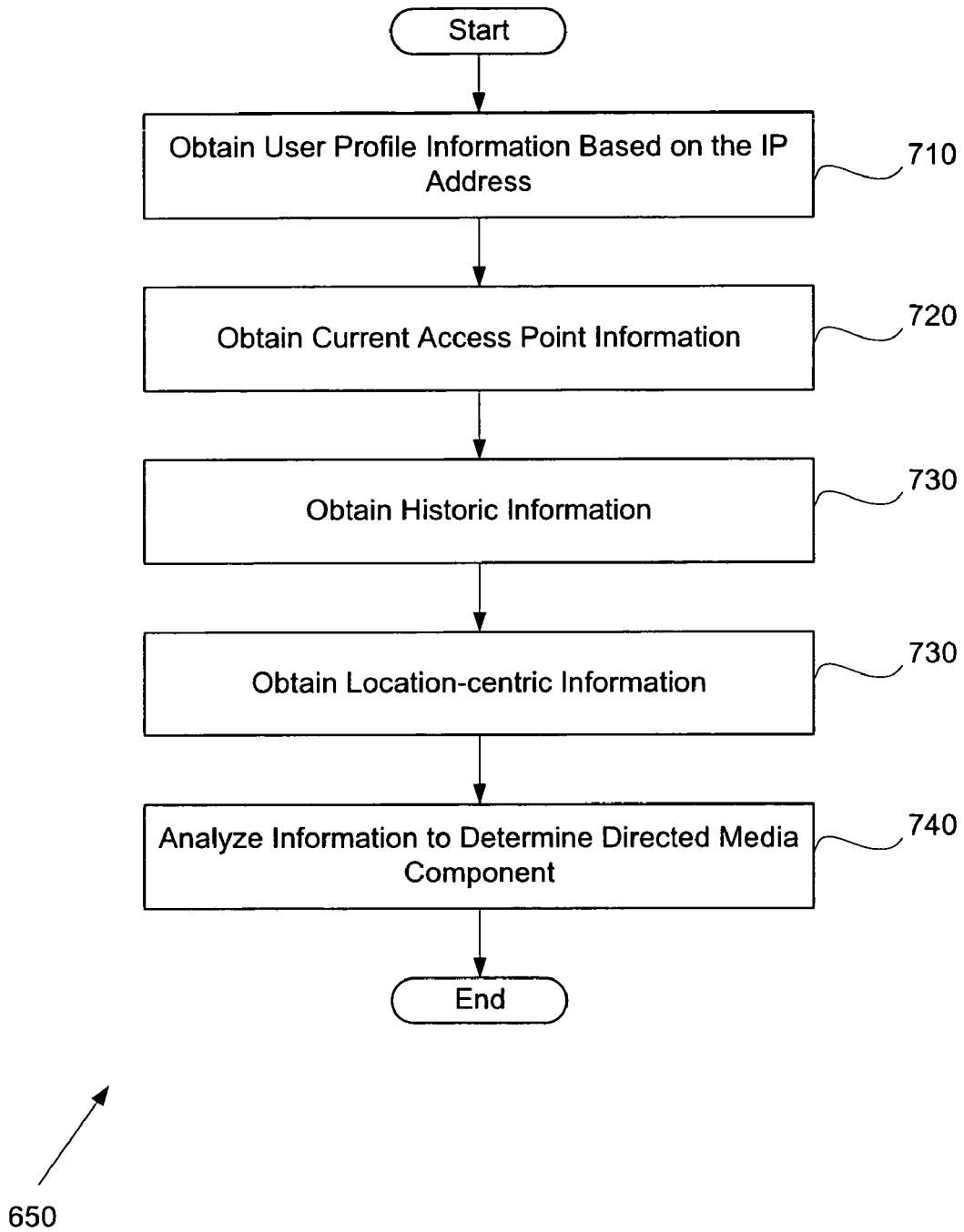
FIG. 7 is a flowchart of an exemplary method for optimizing selection of the directed media.

Referring now to FIG. 7, an exemplary flowchart of the exemplary method for optimizing selection of the directed media (step 650) is provided. In step 710, the CR server 150 uses the received IP address (from step 640) to obtain the corresponding user profile information. In one embodiment, the user information module 410 (FIG. 4) receives both the device identifier (e.g., MAC address) and the IP address of the network access device 110 when the user first accesses the network 130. Based on the IP address received from the content provider 140, the CR server 150 (e.g., the media selection optimizer 340) can determine the corresponding device identifier and retrieve the user profile associated with the device identifier from the storage system 330.

In step 720, the access point information module 420 obtains current access point information. The access point information may comprise the location of the access point 210, type of establishment associated with the access point (e.g., a coffee shop, city park, etc.), and any other information which may be obtained from the access point 210.

Historic information is obtained by the history module 430 in step 730. Historic information may comprise information such as a number of times the network 130 is accessed by the network access device 110, the corresponding access point 210 used, date and time of access, and so forth which may be tracked by the history module 430. Historic information is then used to establish a pattern for which aspects of the user profile may be developed from. For example, if a user has a history of accessing the network 130 from a particular location at a particular day and time (e.g., corner coffee shop at 10 am every Sunday), the history module 430 will record this pattern, and recall the information when requested by the media selection optimizer 340.

In step 730, location-centric information is obtained via the location-centric module 440. The location-centric information may comprise time, weather, special events, types of businesses located nearby, and any other information related to the location. This information may be obtained from the access point 210 or from other sources such as, for example, websites, weather services, and GPS satellites. In some embodiments, the local information may be stored in the storage system 330. In other embodiments, the local information is constantly updated and thus is not stored in the CR server 150 but obtained when needed in real-time.

The user profile information along with any relevant access point information, history information, and/or location-centric information is utilized by the media selection optimizer 340 to determine a directed media component in step 740. The directed media component may be a media tag or directed media which is most relevant to present to the requesting user.

In exemplary embodiment, the analysis performed by the media selection optimizer 340 takes into consideration the user profile which includes user preferences. The user profile will indicate such information as gender, age range, general location (e.g., city of residence or work), preferred access locations (which may be determined by the history module 430 and stored in the user profile), and other preferences. In some embodiments, the media selection optimizer 340 can determine a directed media component based solely on the preferences in the user profile. For example, the user profile may show the user to be male between 18-30 who lives in San Francisco and likes baseball. Based on this user profile, the media selection optimizer 340 may determine that the optimized media should pertain to baseball related (and possibly team specific) media. A corresponding directed media component is then assigned.

In further embodiments, access point, historical, and/or location-centric information may also be included in the analysis by the media selection optimizer 340. For example, the user profile will indicate that the user is male between 18-30 who lives in San Francisco. The access point information may indicate that the user is accessing the network 130 from the baseball stadium. The location-centric information will indicate that it is 80° at the stadium and that it is noon (and thus lunchtime). The media selection optimizer 340, in this example, will factor in the access point and location-centric information to determine that the optimized media should be an advertisement for Coke® since it is a hot day at the ballpark, and the user will likely be getting lunch soon from one of the food vendors (who sells Coke® products). In a less specific example, the directed media component will determine that a soda or food advertisement should be presented.

In an alternative example, the location-centric information may indicate that the baseball team just qualified for postseason playoffs. Based on this new location-centric information, the media selection optimizer 340 may generate a new directed media component that indicates that an advertisement or coupon for purchase of post-season playoff tickets should be presented to the user. A second media component may be generated that offers the user an opportunity to purchase playoff products such as t-shirts and caps, and direct the user to the store across the street from the stadium (i.e., current access point 210 location). Thus, the media selection optimizer 340 may provide more than one directed media component. In some embodiments, the web page from the content provider 140 comprises more than one location for media. In these embodiments, more than one directed media can be provided to the user simultaneously.

It should be noted that the steps of FIG. 7 are exemplary. Alternative embodiments may comprise the steps of FIG. 7 in a different order, or one or more steps (e.g., 720, 730, and 740) may be optional.

While exemplary embodiments were discussed above with reference to using an unique IP address to identify the network access device 110, further embodiments may utilize other unique access information in addition to, or instead of, the IP address. For example, unique browser information, operating system information, or cookie information may be provided by the network access device 110 in the request for access to a web page of the content provider 140. Examples of browser information include, but are not limited to, browser version, browser type, installation date of browser, and session identifiers. Examples of operating system information include, but are not limited to, operating system version, operating system type, and date of operating version installation.

The present invention has been described above with reference to exemplary embodiments. It will be apparent to those skilled in the art that various modifications may be made and other embodiments can be used without departing from the broader scope of the invention. Therefore, these and other variations upon the exemplary embodiments are intended to be covered by the present invention.

What is claimed is:

1. A method for providing directed media to a user on a network, comprising:
receiving a request from the user to access a content provider web site over a network through a network access device operated by the user;
retrieving a persistent device identifier of the network access device;
determining a current network address of the network access device and one or more characteristics of the access device, wherein the current network address is assigned to the network access device by a network service provider for a present network access session;
retrieving historic information for the user, the historic information including patterns of usage for the network access device, and wherein the historic information comprises network access information including times and locations of network access and number of previous network accesses by the network access device;
retrieving location-centric information for a location from which the user is accessing the network;
generating a user profile based on the historic information for the user, the location-centric information, and the one or more characteristics of the access device;
storing the user profile as a record that identifies the user through the current network address and the persistent device identifier associated with the network access device;
incorporating into the user profile one or more group characteristics identifying a group with which the user is associated;
assigning a group identifier to the group based on the patterns of usage;
analyzing the retrieved device identifier, historic information, and location-centric information to determine a directed media component to be provided to the user or the group on the network access device, and
placing directed media referenced by the directed media component in the web site requested by the user request from the content provider, wherein the directed media comprises content that is customized to the user based on the user profile.

2. The method of claim 1 further comprising obtaining user preference information for the user based on information provided directly by the user.

3. The method of claim 1 wherein the retrieved device identifier, historic information, and location-centric information comprises user profile information, and further comprising storing the user profile information in an updateable device record in a storage system.

4. The method of claim 1 wherein the network access device is coupled to the network through an access point, and further comprising retrieving access point information for an access point from which the user is accessing the network.

5. The method of claim 1 further comprising providing the directed media component to at least one of a media server coupled to the network, and a content provider coupled to the network.

6. The method of claim 1 wherein the location-centric information comprises information elements selected from the group consisting of: time, weather, special events, and types of businesses located proximate the user.

7. The method of claim 1 wherein the directed media component is a media tag indicating a type of media to be provided to the user.

8. The method of claim 1 wherein the directed media component is a directed advertisement message including a graphics component displayed on the network access device.

9. The method of claim 1 wherein the assigned network address is an Internet Protocol (IP) address associated with the network access device used by the user, wherein the device identifier is determined based on the IP address.

10. The method of claim 1 wherein the device identifier is a Media Access Control (MAC) address.

11. The method of claim 1 wherein the device identifier is an International Mobile Station Identity (IMSI).

12. The method of claim 1 wherein the device identifier is an International Media Equipment Identity (IMEI).

13. The method of claim 1 wherein the group comprises a plurality of users sharing a common characteristic including at least one of age, gender, residence, or hobby.

14. The method of claim 13 wherein a separate group identifier is assigned to each common characteristic shared by the user and one or more of the plurality of users.

15. A system for providing directed media to a user on a network, comprising:
- a network module receiving a request from the user to access a content provider web site over a network through a network access device operated by the user;
- an information collection engine configured to retrieve a persistent device identifier and one or more characteristics of the network access device operated by the user, determine a current network address of the network access device and one or more characteristics of the access device, wherein the current network address is assigned to the network access device by a network service provider, retrieve historic information for the user, the historic information including patterns of usage for the network access device, and wherein the historic information comprises network access information including times and locations of network access and number of previous network accesses by the network access device, and retrieving location-centric information for a location from which the user is accessing the network; and
- a user profile component generating a user profile based on the historic information for the user, the location-centric information, and the one or more characteristics of the access device, and incorporating into the user profile one or more group characteristics identifying a group with which the user is associated, and assigning a group identifier to the group based on the patterns of usage, and storing the user profile as a record that identifies the user through the current network address and persistent device identifier associated with the network access device; and
- a media selection optimizer circuit configured to determine a directed media component to transmit to the user or the group based on a user profile, the user profile being associated with the device identifier and the information provided by the information collection engine, the media selection optimizer further placing directed media referenced by the directed media component in the web site requested by the user request from the content provider, wherein the directed media comprises content that is customized to the user based on the user profile.

16. The system of claim 15 further comprising a profile engine configured to update and maintain the user profile.

17. The system of claim 15 further comprising a user information module configured to obtain user preference information for the user based on information provided directly by the user.

18. The system of claim 15 further comprising an access point information module configured to obtain information associated with an access point from which the network access device is accessing the network.

19. The system of claim 15 further comprising a history module configured to maintain historical information associated with the network access device.

20. The system of claim 15 wherein the location-centric information comprises information elements selected from the group consisting of: time, weather, special events, and types of businesses located proximate the user.

21. The system of claim 15 further comprising a media server configured to receive the direct media component and provide directed media to a page of a content provider.

22. The system of claim 15 wherein the group comprises a plurality of users sharing a common characteristic including at least one of age, gender, residence, or hobby.

23. The system of claim 22 wherein a separate group identifier is assigned to each common characteristic shared by the user and one or more of the plurality of users.

24. A machine-readable storage medium having stored thereon a program, the program being executable to provide a method for providing directed media to a user on a network, the method comprising:
- receiving a request from the user to access a content provider web site over a network through a network access device operated by the user;
- retrieving a persistent device identifier of the network access device;
- determining a current network address of the network access device and one or more characteristics of the access device, wherein the current network address is assigned to the network access device by a network service provider for a present network access session;
- retrieving historic information for the user, the historic information including patterns of usage for the network access device, and wherein the historic information comprises network access information including times and locations of network access and number of previous network accesses by the network access device;
- retrieving location-centric information for a location from which the user is accessing the network;
- generating a user profile based on the historic information for the user, the location-centric information, and the one or more characteristics of the access device;
- storing the user profile as a record that identifies the user through the current network address and the persistent device identifier associated with the network access device;
- incorporating into the user profile one or more group characteristics identifying a group with which the user is associated;
- assigning a group identifier to the group based on the patterns of usage;
- analyzing the retrieved device identifier, historic information, and location-centric information to determine a directed media component to be provided to the user or the group on the network access device, and
- placing directed media referenced by the directed media component in the web site requested by the user request from the content provider, wherein the directed media comprises content that is customized to the user based on the user profile.

* * * * *